United States Patent
Kumar et al.

(10) Patent No.: US 8,595,370 B2
(45) Date of Patent: *Nov. 26, 2013

(54) PROVIDING A RELIABLE TRUST INDICATOR FOR CONTENT

(71) Applicant: Yahoo! Inc., Sunnyvale, CA (US)

(72) Inventors: Amit Kumar, San Jose, CA (US); Rajat Mukherjee, San Jose, CA (US); J. Eric Baldeschwieler, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,581

(22) Filed: Sep. 24, 2012

(65) Prior Publication Data

US 2013/0018737 A1 Jan. 17, 2013

Related U.S. Application Data

(63) Continuation of application No. 11/491,365, filed on Jul. 21, 2006, now Pat. No. 8,301,728.

(51) Int. Cl.
*G06F 15/16* (2006.01)
*G06F 17/00* (2006.01)

(52) U.S. Cl.
USPC ............ 709/229; 709/203; 709/219; 715/205

(58) Field of Classification Search
USPC .................. 709/217, 218, 219; 715/234, 700; 707/104
See application file for complete search history.

(56) References Cited

U.S. PATENT DOCUMENTS

| 7,266,762 | B1 | 9/2007 | Chakrabarti et al. |
| 2003/0126560 | A1* | 7/2003 | Kurapati et al. ............... 715/514 |
| 2003/0221162 | A1* | 11/2003 | Sridhar ...................... 715/501.1 |
| 2006/0242553 | A1 | 10/2006 | Kulas |

OTHER PUBLICATIONS

U.S. Appl. No. 11/498,540, filed Aug. 2, 2006, Notice of Allowance, Mailing Date Mar. 15, 2013.

* cited by examiner

*Primary Examiner* — Evans Desrosiers
(74) *Attorney, Agent, or Firm* — Hickman Palermo Truong Becker Bingham Wong LLP; Daniel D. Ledesma

(57) ABSTRACT

A technique is provided for providing a trust indicator for a particular webpage. The trust indicator may indicate whether publishers of web content and/or end-users trust the content of the particular webpage and whether the particular webpage is popular. A user requests, via a web browser a webpage to be displayed. A process associated with the webpage requests a value to be displayed along with the webpage. The value may indicate 1) a number of links that link to the webpage, 2) a number of user-created tags that have been associated with the webpage, or 3) a trust rank that a web crawler associates with the webpage. A trust rank may be based, at least in part, on user-created tags that have been associated with the webpage. A value may also be associated with an advertisement that is displayed along with a particular webpage.

32 Claims, 5 Drawing Sheets ized webpage, or 3) a trust rank of the displayed webpage. The trust rank is based, at least in part, on user-created tags that have been associated with the dis-
PROVIDING A RELIABLE TRUST INDICATOR FOR CONTENT

CROSS-REFERENCE TO RELATED APPLICATIONS; BENEFIT CLAIM

This application is a Continuation of U.S. patent application Ser. No. 11/491,365, filed Jul. 21, 2006, the entire contents of which is hereby incorporated by reference for all purposes as if fully set forth herein. The Applicant hereby rescinds any disclaimer of claim scope in the parent application(s) or the prosecution history thereof and advise the USPTO that the claims in this application may be broader than any claim in the parent application.

FIELD OF THE INVENTION

The present invention relates to providing a trust indicator for a webpage that indicates whether publishers of web content and/or end-users trust the content of the webpage.

BACKGROUND

A web counter or hit counter is a computer software program that indicates the number of visitors, or hits, a particular webpage has received. Once set up, these counters are incremented every time the webpage is accessed by a user's web browser. Because the number of a counter is a proxy for popularity of the associated webpage (i.e. the higher the count the more visitors), webmasters tended to place web counters on their webpages to advertise this popularity, hoping that future users would also trust and frequently visit their websites.

However, web counters have fallen out of favor of webmasters (and users) in the last few years for several reasons. For example, web counters are not necessarily trustworthy. A webmaster could start the counter at a high number to give the impression that the corresponding webpage is more popular than it actually is, or increment the counter by an integer greater than one. Also, web counters are no longer associated with the impression of professional web design but rather are considered by some as a gimmicky feature. Furthermore, web counters are limited to the "visits" of end-users and do not take into account what other publishers of web content "think" about a particular webpage or website.

Thus, currently there is no efficient and trustworthy mechanism that indicates the trust that publishers of web content and/or end-users attribute to a particular webpage or website. Also, there is no efficient mechanism for a webmaster to determine how well the webmaster is doing in terms of marketing his/her content other than the sales of the webmaster's product or service and/or advertisement revenue.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
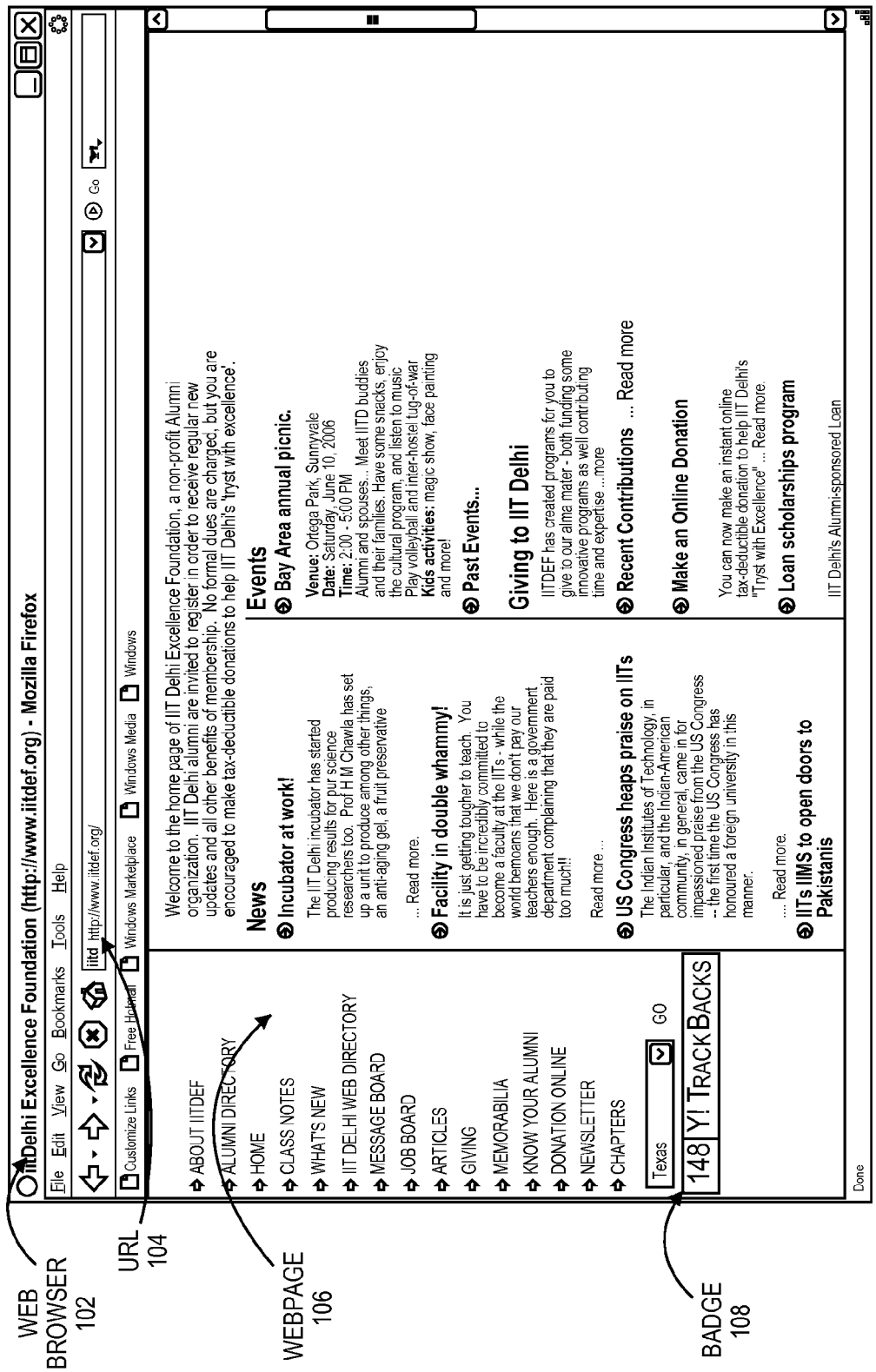
FIG. 1 is a diagram that illustrates a badge that contains a value indicating the popularity of a webpage, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A technique is described for providing a value to a webpage in order to indicate how popular (and thus how trustworthy) end-users and/or publishers of web content consider the webpage to be. Inquiry into the value may further indicate, in addition to popularity, how end-users and web publishers view the content on the webpage or the corresponding website.

A webmaster may place executable code in the source HTML code of a webpage. When the HTML code is loaded into an end-user's browser, the browser executes the executable code. The execution causes a request to be made to an entity (such as Yahoo!™) associated with a web crawler. The entity returns a value which the web browser displays along with the webpage that is loaded. The displayed value may be any, all, or a combination of the following: 1) a number of links from linking webpages that link to the displayed webpage, 2) a number of user-created tags that have been associated with the displayed webpage, or 3) a trust rank of the displayed webpage. The trust rank is based, at least in part, on user-created tags that have been associated with the displayed webpage. With this value, webmasters and end-users have a more accurate understanding of whether the displayed webpage is popular and whether other end-users and/or web publishers consider the displayed webpage trustworthy.

In one approach, a clickable item is also provided to the web browser. The value itself may be a clickable item that, when selected, initiates a second request to be sent to the entity associated with the web crawler. In response to the second request, a new page is provided that contains a subset of the links (if the value is a number of links) and/or a subset of the tags (if the value is a number of tags). With this further information, webmasters and end-users have a comprehensive and accurate view of how other end-users and web publishers view the displayed webpage. By viewing the webpages that link to the displayed webpage, an end-user can validate whether the listed links are legitimate, and thus can better determine whether the displayed webpage is legitimate. By viewing tags (i.e. user-created words or phrases that describe content of a webpage) that end-users have associated with the displayed webpage, a webmaster can understand how end-users view the content of the displayed webpage and make decisions regarding the future of the displayed webpage or website accordingly.

Tags

A tag is a keyword, label, or descriptive term associated with an item as a means of classification. Tags are usually chosen informally and personally by a user of the item. For example, a user discovers a webpage that discusses Indian cooking. The user creates a tag that associates one or more words with the webpage, such as "Indian cooking".

Thus, tags are not usually part of a formally defined classification scheme. Tags are typically used in dynamic, flexible, automatically generated Internet taxonomies for online resources such as computer files, web pages, digital images, and Internet bookmarks. Some users use tags as an alternative to the "Bookmark" option provided by the major web browsers.

Typically, an item will have one or more tags associated with it, as part of an automated classification software or system. MyWeb (provided by Yahoo!™) and Del.icio.us are popular social bookmarking sites that provide an automated classification system. These tags may be machine-generated or relevant suggestions from other users. The system provides links to other items that share that keyword tag, or even to specified collections of tags. This allows for multiple "browseable paths" through the items which can quickly and easily be altered by the collection's administrator, with minimal effort and planning. These tags also allow for the retrieval of content via search beyond the contents of the documents themselves.

Trackback Badge

According to an embodiment, a webmaster places a "badge" on any or all webpages of a website. The badge contains one or more values. Code associated with the badge may, when executed, cause the web browser to request and receive the value(s) from a remote server on the Internet.

An example of code that is associated with the badge may be the following:

```
<script>
    function cb(o)document.getElementById("tbsn").innerHTML =
    o.ResultSet.totalResultsAvailable;} var url =
    location.href; var so = document.createElement("script");
    so.setAttribute("src",
    "http://api.search.yahoo.com/SiteExplorerService/V1/
    inlinkData?appid=ytrackback&query="+url+"&results=
    1&output=json&callback=cb");
    document.getElementsByTagName("head").item(0).-
    appendChild(so); document.write("<a
    href='http://siteexplorer.search.yahoo.com/search?p=" +
    url + "&bwm=i'>");
</script>
<span style="background:#fff;padding:1px;font-
family:Geneva,Vera,Arial,Helvetica,sans-serif;font-size:x-
small;font-variant:small-caps;; padding: 3px 1px 3px
1px;border:1px solid #aaa;">
    <span id="tbsn"
    style="color:#f8f8f8;background:#a42;padding:2px 3px 2px
    3px;">0
    </span>
    <span style="color:#f8f8f8;background:#886;padding:2px 5px
    2px 4px;">Y! TrackBacks
    </span>
</span></a>
```

The value(s) may include 1) a number of links that link to a webpage, 2) a number of user-created tags that have been associated with the website, or 3) a trust rank that is based, at least in part, on user-created tags that have been associated with the webpage. This badge allows the webmaster and end-users to gauge what other end-users and/or web publishers think of the corresponding webpage, and how authoritative the page is.

In one embodiment, a badge is implemented using the Yahoo! Developer Network JSON APIs and Cascade Style Sheet (CSS), which is a W3C recommendation. However, any mechanism may be used for providing the badge to a web browser displaying the webpage. If the JSON APIs and pure CSS are used, then a webmaster is not required to write any code in order to enable the badge on a webpage. The "look and feel" of the badge may be customized freely.

FIG. 1 is a diagram that illustrates a badge 108 that contains a value indicating the popularity of a webpage 106, according to an embodiment of the invention. A user enters a Uniform Resource Locator (URL) 104 into the search field of web browser 102. When the website corresponding to URL 104 is accessed, web browser 102 executes the code associated with badge 108. The executed code causes a request to be made to an entity (e.g., Yahoo!™) associated with a web crawler. The entity returns one or more values indicating the popularity of webpage 106. The value(s) may be sent toward the server hosting the website associated with URL 104, which forwards the value toward web browser 102 to be displayed, or the value may be sent toward web browser 102 without being sent toward the aforementioned server. In this example, the value indicated by badge 108 is 148. This value may indicate a number of links from linking webpages that link to webpage 106 or the value may indicate a number of user-created tags that have been associated with URL 104 to describe the content of webpage 106.

In one embodiment, the value indicated by the badge is updated automatically when the number of links and/or tags changes or when the trust rank changes. Thus, the end-user and webmaster are ensured to have up-to-the-minute accurate information about what web publishers and/or end-users think about the displayed webpage.

Site Explorer

In one embodiment, the badge is a clickable item that, when selected, causes a new page to be generated at a remote server and sent to the browser. This new page will be referred to hereinafter as "Site Explorer". Site Explorer may be generated in a new window or in the window that currently displays the displayed webpage. Site Explorer may list at least a subset of the links if the value contained in the badge indicates a number of links. Alternatively, if the value indicates a number of tags, then the Site Explorer may list at least a subset of the tags. Alternatively, Site Explorer may list both links and tags.

In one embodiment, the badge does not include a value. Instead, the badge is a clickable graphic that, when selected, causes Site Explorer to be generated and displayed to the user that selected the badge.

In one embodiment, the appearance of the badge may be changed automatically (i.e. without refreshing the webpage). For example, the badge may be color-coded based on the trust value or popularity value, such as the number of tags. As another example, the value may change automatically from indicating the number of links to the number of tags to a trust rank. One way to implement dynamically modifying the appearance of badge is to include code (e.g. javascript) that, when executed, periodically calls the entity (that provides the value to the badge) to modify the appearance of the badge. In the future, if the entity decides to change the appearance of the badge, such as the text of the badge, then the webmaster of the webpage does not have to alter the badge himself.

Figure 2:
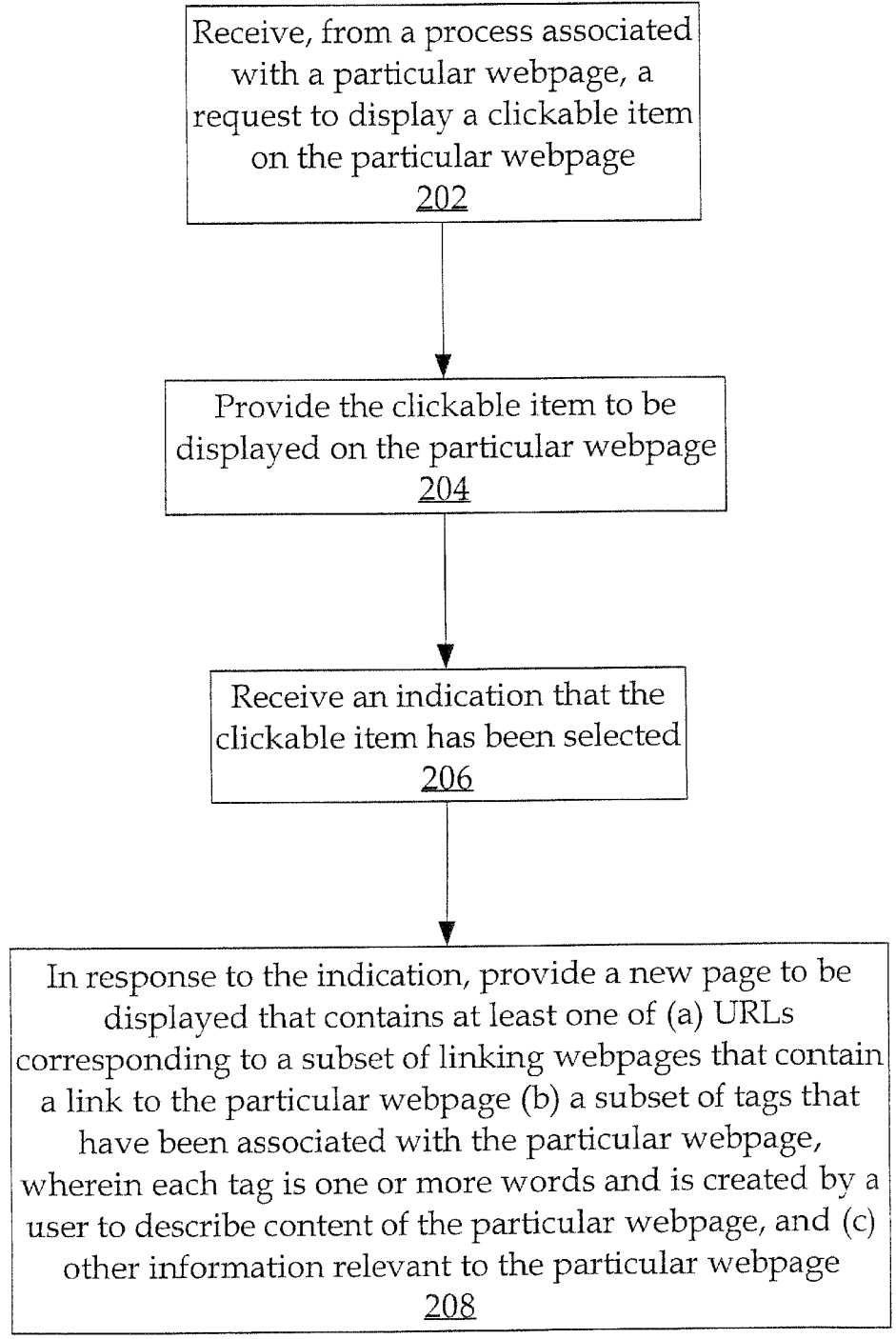
FIG. 2 is a flowchart that illustrates steps for providing link or tag information pertaining to a particular webpage to a web browser, according to an embodiment of the invention.

FIG. 2 is a flowchart that illustrates steps for providing link or tag information pertaining to a particular webpage to a web browser, according to an embodiment of the invention. A request is received from a process associated with a particular webpage. The request is to display a clickable item (e.g. badge) on the particular webpage. The clickable item is provided to be displayed on said particular webpage. An indication is received that the clickable item has been selected. In response to the indication, a new page is provided to be displayed that contains (a) URLs corresponding to a subset of linking webpages that contain a link to the particular webpage, (b) a subset of user-created tags that have been associated with the particular webpage, and/or (c) other information relevant to the particular webpage.

Link Information

Figure 3:
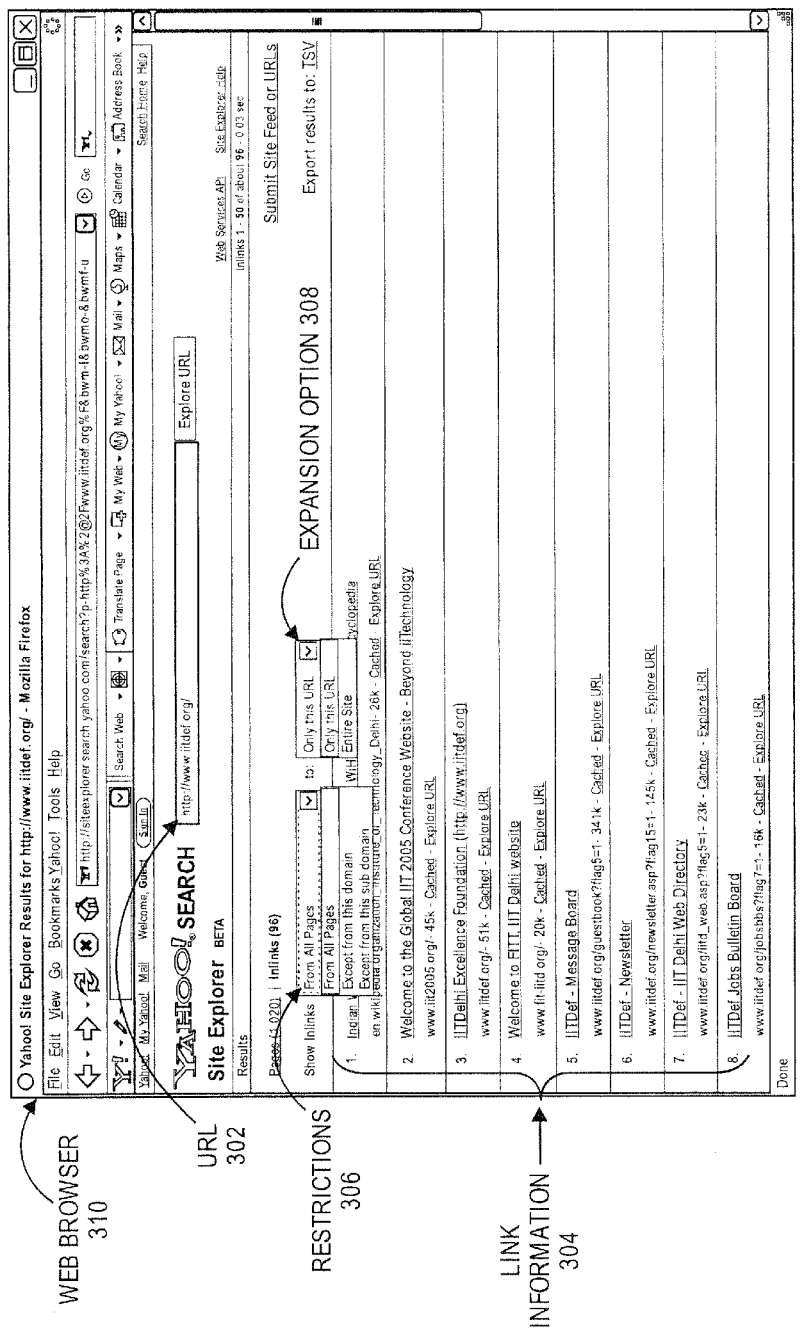
FIG. 3 is a diagram that illustrates how link information pertaining to a particular webpage may be displayed, according to an embodiment of the invention.

FIG. 3 is a diagram that illustrates how Site Explorer may display link information 304 pertaining to a URL 302 in a web browser 310, according to an embodiment of the invention. In this example, URL 302 is http://www.iitdef.org. Link information 304 includes Uniform Resource Locators (URLs) of webpages that contain links to URL 302. Restrictions 306 may restrict the URLs specified in link information 304. Site Explorer may also include an expansion option 308 that allows a user or webmaster of URL 302 to view link information 304 pertaining to all webpages associated with the website of URL 302, as opposed to just the webpage of URL 302.

The links in link information 304 may be ordered based on which links were most recently-created. Alternatively (or in addition to creation time), the order of links in Site Explorer may be based on the trust rank of the webpages that link to the displayed webpage. A trust rank of a particular webpage is determined by the entity (e.g. Yahoo!™) that responds to the initial request for the value. A trust rank of a particular webpage may be based on multiple factors that may include, but are not limited to, a) a number of webpages that link to the particular webpage, b) what type of webpages link to the particular webpage (e.g. whether they are spam sites), c) a number of user-created tags that have been associated with the particular webpage, d) content of the particular webpage, and e) the category/topic of the particular webpage.

In one embodiment, for each link displayed in Site Explorer, additional information is displayed. The additional information may include the link's anchor text. Anchor text is the visible text in a link and tends to be highly relevant to the "landing page". The additional information may alternatively (or also) include "surrounding text" that surrounds (or is adjacent to) the link and/or anchor text.

Figure 4:
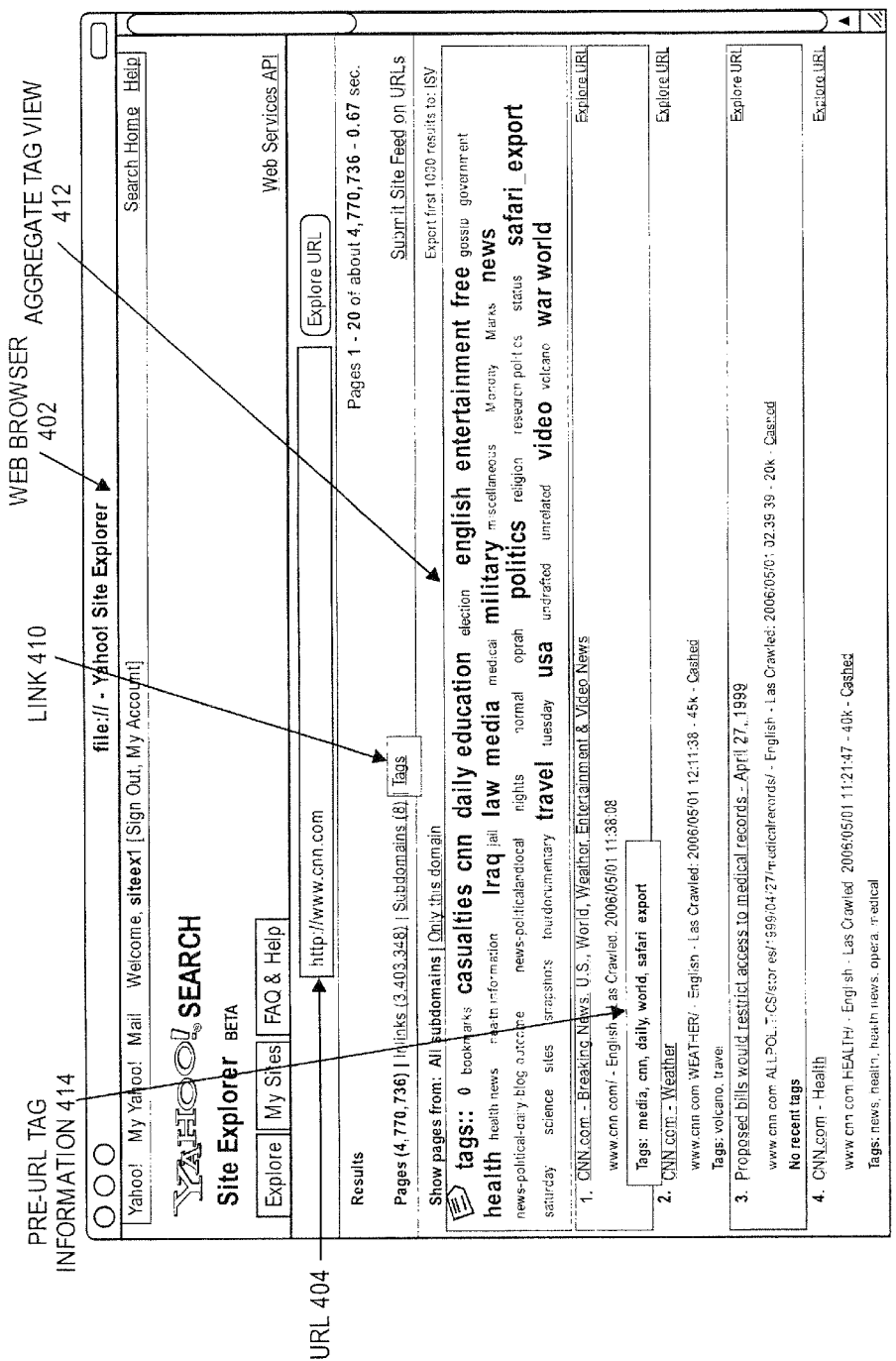
FIG. 4 is a diagram that illustrates a "cloud of information" that are based on certain keywords corresponding to particular webpage to be displayed, according to an embodiment of the invention.

The additional information may include a "cloud of information" that is based on a set of keywords corresponding to the displayed webpage, as shown in FIG. 4. The set of keywords may include an aggregate of the anchor text of links that link to the displayed webpage. The set of keywords may also include (or alternatively include) all or a subset of the user-created tags that have been associated with the displayed webpage. FIG. 4 illustrates a web browser 402 displaying tag information pertaining to URL 404, which is http://www.cnn.com in this example. When a link 410, displayed via web browser 402, is selected, the "cloud of information" (or aggregated tag view 412) is displayed. The tags specified in aggregated tag view 412 may pertain to at least a subset of user-created tags that have been associated with just URL 404. Alternatively, the tags specified in aggregated tag view 412 may pertain to some of the other webpages associated with URL 404, such as http://www.cnn.com/health and http://www.cnn.com/weather.

In one embodiment, the number of links indicated by the badge is determined by crawling the entire searchable World Wide Web. Alternatively, the number of links indicated by the badge may be restricted in some manner. For example, the number of links may be restricted to only shopping sites, non-spam sites, a list of sites specified by the webmaster of the displayed webpage, etc. The number of links may indicate what webpages or websites not to include in the value. In other words, the number of links may be restricted from certain sites, such as sites owned or administered by the webmaster of the displayed webpage.

In one embodiment, the number of links indicated by badge may also be limited in that no two links are from the same domain. This restriction effectively weights one web publisher equal to another web publisher. The fact that one web publisher is constantly linking to the displayed webpage may not be interesting to an end-user or the webmaster of the displayed webpage.

In some cases, multiple domains represent the same content, such as http://www.ycoolthing.com and http://ycoolthing.com. Therefore, in one embodiment, the number of links may be restricted to webpages that contain unique content. The rationale for this restriction may be the same as the rationale given for the immediately previous restriction.

In FIG. 3, restrictions 306 include "From All Pages", which, when selected lists all pages that contain a link to webpage 302. Restrictions 306 also include the "Except from this domain" restriction, which, when selected, lists all webpages that contain a link to webpage corresponding to URL 302 except those pages from the domain indicated by URL 302. Restrictions 306 also include the "Except from this subdomain" restriction, which, when selected, lists all webpages that contain a link to URL 302 except those pages from the subdomain indicated by URL 302. In this example, "From All Pages" is the default restriction but any of the restrictions, including other restrictions mentioned above, may be the default restriction.

Tag Information

If the value indicated by the badge is a number of user-created tags that have been associated with the displayed webpage, then selecting the badge causes Site Explorer to be generated and displayed on a user's computer. Site Explorer would then lists such tags.

In one embodiment, the order in which tags are displayed in Site Explorer is based, at least partially, on the order in which tags have been created. In one embodiment, the order in which tags are displayed in Site Explorer is based, at least partially, on how many of each tag has been associated with the webpage. If two tags are closely related (i.e. "travel" and "traveling") then the number of the closely-related tags may be aggregated (i.e. added together), at least for purposes of order.

In one embodiment, the viewable attributes (e.g. font size, font type, color) of a particular displayed tag indicates how often the particular displayed tag has been associated with the displayed webpage, relative to other displayed tags.

Advertisements

Some webpages contain slots that are designated for advertisements. When a webpage is displayed in a user's web browser window, an advertisement may be dynamically selected to be placed in the slot. The selection is based, at least partially, on content of the displayed webpage. If the displayed webpage is about sports, then the advertisement may be, for example, about a particular sports drink. As another example, if the displayed webpage is about the stock market, then the advertisement may be about a particular mutual fund.

In some cases, it is useful to know the popularity or trustworthiness of a particular advertisement. A similar mechanism as described above may be used for attaching a badge to each advertisement that is displayed along with the displayed webpage. Thus, when a webpage is loaded into a web browser window, a request is sent to the entity that provides the advertisement. A value (e.g., contained in a badge) associated with an advertisement may indicate 1) a number of links that correspond to linking webpages that contain a link to an advertisement webpage corresponding to the advertisement, 2) a number of user-created tags that are associated with the advertisement webpage, or 3) a trust rank that a web crawler, which is associated with the entity that receives the request, associates with the advertisement webpage. The trust rank may be based on content of the advertisement webpage and/or user-created tags that have been associated with the advertisement webpage.

In one embodiment, when multiple advertisements are displayed on a webpage, there may be a single badge that represents the combined trust value of all the advertisements displayed on the webpage. This may help the user determine the quality of the webpage as well as the advertisements.

In one embodiment, the badge may be a clickable item that, when selected, opens a Site Explorer, similar to the Site Explorer described above. The Site Explorer may display URLs of webpages that contain links to the advertisement webpage (or any webpage on the same website of the advertisement) and/or user-created tags that have been associated with the advertisement webpage (or any webpage on the same website of the advertisement).

Hardware Overview

Figure 5:
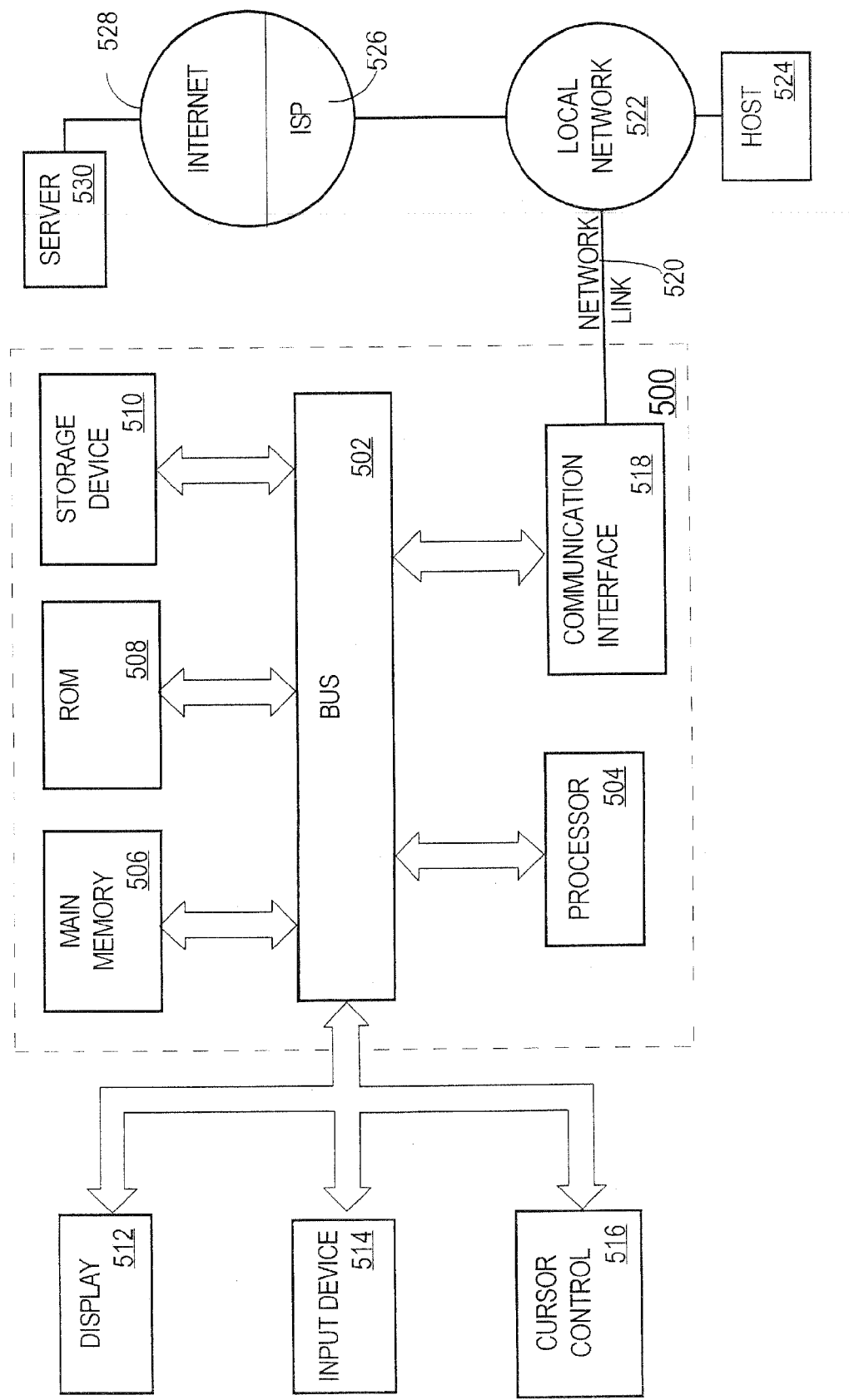
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a request to provide a set of one or more advertisements to be displayed on a particular webpage;
in response to receiving the request, causing the set of one or more advertisements to be displayed on said particular webpage; and
causing, to be displayed on said particular webpage, a value for each advertisement in the set, wherein said value is selected from a group consisting of:
a link count indicating a number of links from a plurality of linking webpages that each links to an advertisement webpage corresponding to said each advertisement;
a tag count indicating a number of tags that have been associated with said advertisement webpage by a plurality of users who have visited said advertisement webpage, wherein each tag of said tags is (a) one or more words and (b) created, by a user of the plurality of users to describe content of said advertisement webpage, subsequent to the creation of said advertisement webpage; and
a trust rank that a web crawler, which is associated with an entity that receives the request, associates with said advertisement webpage, wherein the trust rank is based, at least in part, on user-created tags that describe content of said advertisement webpage and that have been associated with said advertisement webpage subsequent to the creation of said advertisement webpage.

2. The method of claim 1, wherein each advertisement in the set comprises a link to the advertisement webpage of said advertisement.

3. The method of claim 1, wherein:
providing said value for each advertisement in the set includes providing a clickable item to be displayed on said particular webpage; and
the method further comprising:
receiving an indication that the clickable item has been selected; and
in response to the indication, providing a new page that contains at least one of (a) Uniform Resource Locators (URLs) of a subset of said plurality of linking webpages or (b) a subset of said tags.

4. A method comprising:
receiving, from a process associated with a particular webpage, a request to display a clickable item on said particular webpage;
providing, to said process, said clickable item to be displayed on said particular webpage;
after providing said clickable item to said process, receiving an indication that the clickable item has been selected; and
in response to said indication, providing a new page to be displayed that contains at least one of (a) URLs corresponding to a subset of linking webpages that each contains a link to said particular webpage, wherein the linking webpages are determined to contain a link to said particular webpage by an automated web crawler or (b) a subset of tags that have been associated with said particular webpage by a plurality of users who have visited said particular webpage, wherein each tag is one or more words and is created, by a user of the plurality of users who has visited said particular webpage to describe content of said particular webpage, subsequent to the creation of said particular webpage.

5. The method of claim 4, wherein:
if the new page contains the URLs corresponding to the subset of linking webpages, then the URLs are ordered based on linking webpages that most recently added a link to said particular webpage; and
if the new page contains the subset of tags that have been associated with said particular webpage, then the subset of tags are ordered based on the most recently created tags.

6. The method of claim 4, wherein:
the new page contains the URLs corresponding to the subset of linking webpages; and
the URLs are ordered based on trust rank of each of the linking webpages corresponding to the URLs.

7. The method of claim 4, wherein:
the new page contains the URLs corresponding to the subset of linking webpages; and
the method further comprising, for each URL of said URLs, providing, to be displayed on said new page, at least one of (a) anchor text from the linking webpage corresponding to said each URL or (b) text, from the corresponding linking webpage, that is adjacent to said anchor text.

8. The method of claim 4, wherein:
the new page contains the URLs corresponding to the subset of linking webpages; and
the method further comprising providing a set of keywords to be displayed on said new page, wherein the set of keywords includes at least one of (a) anchor text from said subset of linking webpages or (b) multiple tags that have been associated with said particular webpage.

9. The method of claim 4, wherein:
the new page contains the subset of tags that have been associated with said particular webpage; and
the subset of said tags are ordered based on a frequency of each unique tag or closely related tags.

10. The method of claim 4, wherein:
the new page contains the URLs corresponding to the subset of linking webpages; and
the URLs are determined from searching substantially the entire World Wide Web.

11. The method of claim 4, wherein:
the new page contains the URLs corresponding to the subset of linking webpages; and
said subset of linking webpages are limited to a certain category of webpages.

12. The method of claim 4, wherein:
the new page contains the URLs corresponding to the subset of linking webpages; and
said subset of linking webpages are limited to webpages that are not owned by an owner of said particular webpage.

13. The method of claim 4, wherein:
the new page contains the URLs corresponding to the subset of linking webpages; and
each linking webpage of said subset is from a different domain.

14. The method of claim 4, wherein:
the new page contains the URLs corresponding to the subset of linking webpages; and
each linking webpage of said subset contains content different from every other linking webpage of said subset.

15. The method of claim 4, wherein the clickable item displayed on said particular webpage includes at least one of (a) a link count that indicates a number of links from linking webpages that link to said particular webpage or (b) a tag count that indicates a number of said tags.

16. The method of claim 4, further comprising modifying an appearance of the clickable item.

17. One or more non-transitory machine-readable media storing instructions which, when executed by one or more processors, cause:
receiving a request to provide a set of one or more advertisements to be displayed on a particular webpage;
in response to receiving the request, causing the set of advertisements to be displayed on said particular webpage; and
causing, to be displayed on said particular webpage, a value for each advertisement in the set, wherein said value is selected from a group consisting of:
a link count indicating a number of links from a plurality of linking webpages that each links to an advertisement webpage corresponding to said each advertisement;
a tag count indicating a number of tags that have been associated with said advertisement webpage by a plurality of users who have visited said advertisement webpage, wherein each tag of said tags is (a) one or more words and (b) created, by a user of the plurality of users to describe content of said advertisement webpage, subsequent to the creation of said advertisement webpage; and
a trust rank that a web crawler, which is associated with an entity that receives the request, associates with said advertisement webpage, wherein the trust rank is based, at least in part, on user-created tags that describe content of said advertisement webpage and that have been associated with said advertisement webpage subsequent to the creation of said advertisement webpage.

18. The one or more non-transitory machine-readable media of claim 17, wherein each advertisement in the set comprises a link to the advertisement webpage of said advertisement.

19. The one or more non-transitory machine-readable media of claim 17, wherein:
causing said value for each advertisement in the set to be displayed includes causing a clickable item to be displayed on said particular webpage; and
the instructions, when executed by the one or more processors, further cause:
receiving an indication that the clickable item has been selected; and
in response to the indication, providing a new page that contains at least one of (a) Uniform Resource Locators (URLs) of a subset of said plurality of linking webpages or (b) a subset of said tags.

20. One or more non-transitory machine-readable media storing instructions which, when executed by one or more processors, cause:
receiving, from a process associated with a particular webpage, a request to display a clickable item on said particular webpage;
providing, to said process, said clickable item to be displayed on said particular webpage;
after providing said clickable item to said process, receiving an indication that the clickable item has been selected; and
in response to said indication, providing a new page to be displayed that contains at least one of (a) URLs corresponding to a subset of linking webpages that each contains a link to said particular webpage, wherein the linking webpages are determined to contain a link to said particular webpage by an automated web crawler or (b) a subset of tags that have been associated with said particular webpage by a plurality of users who have visited said particular webpage, wherein each tag is one or more words and is created, by a user of the plurality of users who has visited said particular webpage to describe content of said particular webpage subsequent to the creation of said particular webpage.

21. The one or more non-transitory machine-readable media of claim 20, wherein:
if the new page contains the URLs corresponding to the subset of linking webpages, then the URLs are ordered based on linking webpages that most recently added a link to said particular webpage; and
if the new page contains the subset of tags that have been associated with said particular webpage, then the subset of tags are ordered based on the most recently created tags.

22. The one or more non-transitory machine-readable media of claim 20, wherein:
the new page contains the URLs corresponding to the subset of linking webpages; and the URLs are ordered based on trust rank of each of the linking webpages corresponding to the URLs.

23. The one or more non-transitory machine-readable media of claim 20, wherein:
the new page contains the URLs corresponding to a subset of linking webpages; and
the instructions, when executed by the one or more processors, further cause, for each URL of said URLs, providing, to be displayed on said new page, at least one of (a) anchor text from the linking webpage corresponding to said each URL or (b) text from the corresponding linking webpage that is adjacent to said anchor text.

24. The one or more non-transitory machine-readable media of claim 20, wherein:
the new page contains the URLs corresponding to the subset of linking webpages; and
the instructions, when executed by the one or more processors, further cause providing a set of keywords to be displayed on said new page, wherein the set of keywords includes at least one of (a) anchor text from said subset of linking webpages or (b) multiple tags that have been associated with said particular webpage.

25. The one or more non-transitory machine-readable media of claim 20, wherein:
the new page contains the subset of tags that have been associated with said particular webpage; and
the subset of said tags are ordered based on a frequency of each unique tag or closely related tags.

26. The one or more non-transitory machine-readable media of claim 20, wherein:
the new page contains the URLs corresponding to the subset of linking webpages; and
the URLs are determined from searching substantially the entire World Wide Web.

27. The one or more non-transitory machine-readable media of claim 20, wherein:
the new page contains the URLs corresponding to the subset of linking webpages; and
said subset of linking webpages are limited to a certain category of webpages.

28. The one or more non-transitory machine-readable media of claim 20, wherein:
the new page contains the URLs corresponding to the subset of linking webpages; and
said subset of linking webpages are limited to webpages that are not owned by an owner of said particular webpage.

29. The one or more non-transitory machine-readable media of claim 20, wherein:
the new page contains the URLs corresponding to the subset of linking webpages; and each linking webpage of said subset is from a different domain.

30. The one or more non-transitory machine-readable media of claim 20, wherein:
the new page contains the URLs corresponding to the subset of linking webpages; and each linking webpage of said subset contains content different from every other linking webpage of said subset.

31. The one or more non-transitory machine-readable media of claim 20, wherein the clickable item displayed on said particular webpage includes at least one of (a) a link count that indicates a number of links from linking webpages that link to said particular webpage or (b) a tag count that indicates a number of said tags.

32. The one or more non-transitory machine-readable media of claim 20, wherein the instructions, when executed by the one or more processors, further cause modifying an appearance of the clickable item.

* * * * *